United States Patent
Toksvig et al.

(10) Patent No.: US 9,928,639 B2
(45) Date of Patent: Mar. 27, 2018

(54) SYSTEM AND METHOD FOR DEADLOCK-FREE PIPELINING

(71) Applicant: NVIDIA CORPORATION, Santa Clara, CA (US)

(72) Inventors: Michael Toksvig, Palo Alto, CA (US); Erik Lindholm, Saratoga, CA (US)

(73) Assignee: NVIDIA CORPORATION, Santa Clara, CA (US)

( * ) Notice: Subject to any disclaimer, the term of this patent is extended or adjusted under 35 U.S.C. 154(b) by 48 days.

(21) Appl. No.: 14/092,816

(22) Filed: Nov. 27, 2013

(65) Prior Publication Data

US 2014/0092114 A1   Apr. 3, 2014

Related U.S. Application Data

(62) Division of application No. 12/420,751, filed on Apr. 8, 2009, now Pat. No. 8,698,823.

(51) Int. Cl.
  *G09G 5/00* (2006.01)
  *G06T 15/04* (2011.01)
  *G06F 9/52* (2006.01)
  *G06T 1/20* (2006.01)
  (Continued)

(52) U.S. Cl.
  CPC .............. *G06T 15/04* (2013.01); *G06F 9/524* (2013.01); *G06T 1/20* (2013.01); *G06T 15/50* (2013.01); *G09G 5/393* (2013.01)

(58) Field of Classification Search
  CPC .. G06F 9/524; G06F 2209/485; G06F 9/5016; G06T 15/04; G06T 1/20
  See application file for complete search history.

(56) References Cited

U.S. PATENT DOCUMENTS

| 5,034,887 A | 7/1991 | Yasui et al. |
| 5,301,295 A | 4/1994 | Leary et al. |
| 5,455,913 A | 10/1995 | Shrock et al. |

(Continued)

FOREIGN PATENT DOCUMENTS

| CN | 1938730 | 3/2007 |
| JP | 2008-512771 | 4/2008 |

(Continued)

OTHER PUBLICATIONS

Brandt, Scott, "Module 2: Computer-System Structures," http://www/spe/icsc/edif-sbrandt/courses/Spring01/111/slides/mod2.1.pdf, Jan. 1999, pp. 1-12.

(Continued)

*Primary Examiner* — Hau H Nguyen

(57) ABSTRACT

A system and method for facilitating increased graphics processing without deadlock. Embodiments of the present invention provide storage for execution unit pipeline results (e.g., texture pipeline results). The storage allows increased processing of multiple threads as a texture unit may be used to store information while corresponding locations of the register file are available for reallocation to other threads. Embodiments further provide for preventing deadlock by limiting the number of requests and ensuring that a set of requests is not issued unless there are resources available to complete each request of the set of requests. Embodiments of the present invention thus provide for deadlock free increased performance.

18 Claims, 6 Drawing Sheets

(51) Int. Cl.
  *G06T 15/50* (2011.01)
  *G09G 5/393* (2006.01)

(56) References Cited

U.S. PATENT DOCUMENTS

| | | | |
|---|---|---|---|
| 5,546,548 A | 8/1996 | Chen et al. |
| 5,649,230 A | 7/1997 | Lentz |
| 5,706,466 A | 1/1998 | Dockser |
| 5,717,954 A | 2/1998 | Grieff et al. |
| 5,761,468 A | 6/1998 | Emberson |
| 5,768,548 A | 6/1998 | Young et al. |
| 5,790,817 A | 8/1998 | Asghar et al. |
| 5,822,568 A | 10/1998 | Swanstrom |
| 5,864,876 A | 1/1999 | Rossum et al. |
| 5,881,248 A | 3/1999 | Mergard |
| 5,923,859 A | 7/1999 | Melo et al. |
| 5,940,866 A | 8/1999 | Chisholm et al. |
| 5,968,143 A | 10/1999 | Chisholm et al. |
| 6,016,528 A | 1/2000 | Jaramillo et al. |
| 6,018,803 A | 1/2000 | Kardach |
| 6,029,223 A | 2/2000 | Klein |
| 6,029,228 A | 2/2000 | Cai et al. |
| 6,085,276 A | 7/2000 | VanDoren et al. |
| 6,085,278 A | 7/2000 | Gates et al. |
| 6,098,114 A | 8/2000 | McDonald et al. |
| 6,101,568 A | 8/2000 | Richardson |
| 6,157,980 A | 12/2000 | Arimilli et al. |
| 6,175,634 B1 | 1/2001 | Graumann |
| 6,182,112 B1 | 1/2001 | Malek et al. |
| 6,185,634 B1 | 2/2001 | Wilcox |
| 6,205,524 B1 | 3/2001 | Ng |
| 6,226,695 B1 | 5/2001 | Kaiser et al. |
| 6,233,656 B1 | 5/2001 | Jones et al. |
| 6,266,742 B1 | 7/2001 | Challenger et al. |
| 6,298,407 B1 | 10/2001 | Davis et al. |
| 6,314,472 B1 | 11/2001 | Trieu et al. |
| 6,345,341 B1 | 2/2002 | Arimilli et al. |
| 6,397,296 B1 | 5/2002 | Werner |
| 6,418,496 B2 | 7/2002 | Pawlowski et al. |
| 6,442,634 B2 | 8/2002 | Bronson et al. |
| 6,480,939 B2 | 11/2002 | Anderson et al. |
| 6,526,518 B1 | 2/2003 | Catlin et al. |
| 6,560,657 B1 | 5/2003 | Gandhi et al. |
| 6,571,318 B1 | 5/2003 | Sander et al. |
| 6,574,712 B1 | 6/2003 | Kahle et al. |
| 6,578,102 B1 | 6/2003 | Batchelor et al. |
| 6,631,434 B1 | 10/2003 | Johnson et al. |
| 6,681,281 B1 | 1/2004 | Maleck |
| 6,681,285 B1 | 1/2004 | Ng |
| 6,696,854 B2 | 2/2004 | Momtaz et al. |
| 6,696,954 B2 | 2/2004 | Chung |
| 6,745,258 B1 | 6/2004 | Pellegrino et al. |
| 6,751,038 B1 | 6/2004 | Wada |
| 6,754,755 B1 | 6/2004 | Johnson et al. |
| 6,782,457 B2 | 8/2004 | Hill et al. |
| 6,801,963 B2 | 10/2004 | Smith et al. |
| 6,842,803 B2 | 1/2005 | Schmidt et al. |
| 6,877,048 B2 | 4/2005 | Bilak et al. |
| 6,898,649 B2 | 5/2005 | Goudie |
| 6,901,467 B2 | 5/2005 | Shah et al. |
| 6,904,473 B1 | 6/2005 | Bloxham et al. |
| 6,907,480 B2 | 6/2005 | Takei et al. |
| 6,910,106 B2 | 6/2005 | Sechrest et al. |
| 6,915,363 B2 | 7/2005 | Wood et al. |
| 6,950,892 B2 | 9/2005 | Bell, Jr. et al. |
| 6,957,290 B1 | 10/2005 | Rowlands et al. |
| 6,996,684 B2 | 2/2006 | Tseng et al. |
| 6,999,426 B2 | 2/2006 | Miyoshi |
| 7,027,062 B2 * | 4/2006 | Lindholm ............ G06T 11/60 345/552 |
| 7,032,046 B2 | 4/2006 | Horii et al. |
| 7,096,291 B2 | 8/2006 | Lin |
| 7,124,232 B2 | 10/2006 | Takeda et al. |
| 7,139,878 B2 | 11/2006 | Malik et al. |
| 7,143,219 B1 | 11/2006 | Chaudhari et al. |
| 7,177,985 B1 | 2/2007 | Diefendorff |
| 7,263,566 B2 | 8/2007 | Ganasan et al. |
| 7,376,846 B2 | 5/2008 | Hawkins et al. |
| 7,389,466 B1 | 6/2008 | Harmer et al. |
| 7,505,461 B2 | 3/2009 | Matsuda et al. |
| 7,525,986 B2 | 4/2009 | Lee et al. |
| 7,600,058 B1 | 10/2009 | Danilak |
| 7,706,756 B2 | 4/2010 | Sato et al. |
| 7,895,385 B2 | 2/2011 | Raju |
| 8,370,552 B2 | 2/2013 | Mittal et al. |
| 2001/0001873 A1 | 5/2001 | Wickeraad et al. |
| 2001/0014928 A1 | 8/2001 | Chrysos et al. |
| 2002/0023204 A1 | 2/2002 | Barowski et al. |
| 2002/0056027 A1 | 5/2002 | Kanai et al. |
| 2002/0144054 A1 | 10/2002 | Fanning et al. |
| 2002/0184465 A1 | 12/2002 | Grosbach et al. |
| 2003/0126355 A1 | 7/2003 | David |
| 2003/0187911 A1 | 10/2003 | Abd-El-Malek et al. |
| 2003/0191880 A1 | 10/2003 | Lin |
| 2003/0229743 A1 | 12/2003 | Brown |
| 2003/0229762 A1 | 12/2003 | Maiyuran et al. |
| 2004/0024947 A1 | 2/2004 | Barth et al. |
| 2004/0024948 A1 | 2/2004 | Winkler et al. |
| 2004/0049641 A1 | 3/2004 | So et al. |
| 2004/0064649 A1 | 4/2004 | Volpe et al. |
| 2004/0083341 A1 | 4/2004 | Robinson et al. |
| 2004/0088458 A1 | 5/2004 | Tomlinson et al. |
| 2004/0117606 A1 | 6/2004 | Wang et al. |
| 2004/0123043 A1 | 6/2004 | Rotithor et al. |
| 2004/0201647 A1 | 10/2004 | Jackson Pulver et al. |
| 2005/0081014 A1 | 4/2005 | Tran et al. |
| 2005/0138254 A1 | 6/2005 | Raghavan et al. |
| 2005/0216607 A1 | 9/2005 | Munguia |
| 2006/0031389 A1 | 2/2006 | Shimozono et al. |
| 2006/0041721 A1 | 2/2006 | Hakura et al. |
| 2006/0041722 A1 | 2/2006 | Hakura et al. |
| 2006/0041723 A1 | 2/2006 | Hakura et al. |
| 2006/0095677 A1 | 5/2006 | Hakura et al. |
| 2007/0165042 A1 | 7/2007 | Yagi |
| 2007/0198758 A1 | 8/2007 | Asano et al. |
| 2007/0296729 A1* | 12/2007 | Du .................. G06F 9/3012 345/559 |
| 2008/0074433 A1* | 3/2008 | Jiao .................. G06T 15/005 345/522 |
| 2009/0055566 A1 | 2/2009 | Reinig et al. |
| 2009/0066714 A1* | 3/2009 | Liao .................. G06T 11/001 345/582 |
| 2009/0089477 A1 | 4/2009 | Reed |
| 2009/0228631 A1 | 9/2009 | Marulkar et al. |
| 2010/0057973 A1 | 3/2010 | Barake et al. |

FOREIGN PATENT DOCUMENTS

| | | |
|---|---|---|
| KR | 20070064337 | 6/2007 |
| WO | 96/11443 | 4/1996 |
| WO | 2005/093665 | 10/2005 |
| WO | 2006031389 A2 | 3/2006 |

OTHER PUBLICATIONS

"Battery Charging Specification: Revision 1.0," Mar. 8, 2007, pp. i-iv and 1-25.

"Device Class Specification Adopters Agreement," Mar. 8, 2007, pp. 1-5.

Fritts, Jason, "Multi-Level Memory Prefetching for Media and Stream Processing," Proceedings 2002 IEEE International Conference on Multimedia and Expo 2002, ICME '02, vol. 2, Aug. 26-29, 2002, pp. 101-104.

Carter, John, et al., "Impulse: Building a Smarter Memory Controller," Proceedings, Fifth International Symposium on High Performance Computer Architecture, Jan. 9-13, 1999, pp. 1-10.

"Using Spin-Loops on Intel Pentium 4 Processor and Intel Xeon Processor," Version 2.1, May 2001, pp. 1-11.

Jouppi, Norman P., "Improving Direct-Mapped Cache Performance by the Addition of a Small Fully-Associative Cache and Prefetch Buffers," Proceedings 17th Annual International Symposium on Computer Architecture 1990, May 28-31, 1990, pp. 364-373.

(56) References Cited

OTHER PUBLICATIONS

Muller, Alexander, "Der Stack Frame," Online 2003, XP002328991, Retrieved from the Internet: URL: http://www.a-m-i.de/tips/stack/stack.php, retrieved on May 20, 2005, pp. 1-4.

* cited by examiner

SYSTEM AND METHOD FOR DEADLOCK-FREE PIPELINING

CROSS REFERENCE TO RELATED U.S. APPLICATIONS

This Divisional application claims the benefit of the co-pending, commonly-owned U.S. patent application, Ser. No. 12/420,751, filed on Apr. 8, 2009, by Toksvig et al., and titled "System and Method for Deadlock-free Pipelining," which is incorporated herein by reference.

FIELD OF THE INVENTION

Embodiments of the present invention are generally related to instruction processing on graphics processing units (GPUs).

BACKGROUND OF THE INVENTION

As computer systems have advanced, graphics processing units (GPUs) have become increasingly advanced. For example, GPUs include multiple execution units and maintaining the execution units as busy has become an increasingly important task to ensuring high overall GPU performance.

GPUs often include texture units for performing texturing operations. The texture units need to access a texture data stored in memory to perform the texture operations. The memory access usually takes a relatively long time relative to the speed of the execution units of the GPU. Correspondingly, several texture requests are issued at a given time. In some conventional GPUs, each of the texture requests designates a register to obtain the parameters and that register is typically the same for the result of the texture operation.

Unfortunately, register file storage for all the texture operations of a texture pipeline that can be in flight amounts to large amounts of memory storage. The limit on storage thereby creates a limit on the number of requests that can be issued and therefore pixels that can be processed at a time. One solution has been to write the results of the texture operation back to the storage location that contained the texture request. However, this solution still leaves the storage result space allocated for the texture request meaning that the number of pixels can that can be processed in the pipeline at any give time is limited and execution units may not be kept busy thereby impacting the overall performance of the GPU.

One other solution is for each thread to have multiple outstanding texture requests, because this means that few threads are required to cover the texture latency. Unfortunately, each thread also would need more registers to accommodate simultaneous storage of intermediate results. This increases the size of the register file required. It would be advantageous to be able to issue multiple texture instructions per thread, while not requiring a correspondingly large register file. In this fashion, more threads could be issued using the available register file size that is saved, e.g., not allocated to the texture operations.

SUMMARY OF THE INVENTION

Accordingly, what is needed is a system capable of reducing storage requirements and preventing deadlock for graphics threads processing. Embodiments of the present invention provide storage for execution unit pipeline results (e.g., a buffer for texture pipeline results). Embodiments further provide for preventing deadlock by limiting the number of requests of each thread and ensuring that a set of requests is not issued or started unless there are resources available to complete all requests of the set of requests. Embodiments of the present invention thus provide for increased performance without deadlock.

More specifically, embodiments of the present invention allow increased use of each thread having multiple outstanding texture requests without requiring large register file storage because the results of the texture operations are stored in a pipeline buffer. The texture instruction is split into two parts, one is an issue texture request to the texture unit and the second is an operation reading the result back from the texture unit. The result is placed into a pipeline buffer unit, not the register file. To avoid deadlock, a thread may not issue its requests unless the buffer can accommodate all of the requests. This will avoid the situation where a request cannot be satisfied because its data is not present in the buffer. Buffered results will need to be read to avoid stalling the pipeline because all the results slots are occupied. By requiring less register file storages, more threads can be simultaneously processed thereby increasing the parallelism, and therefore performance, of the GPU.

In one embodiment, the present invention is a computer implemented method for preventing deadlock of a graphics processing unit (GPU). The method includes determining a number of available pipeline buffer resources which may be portions of a pipeline (e.g., a portion of a texture pipeline or a buffer of a texture unit) and determining a number of resources being requested based on one or more texture requests of a first thread. If the requested number of resources is less than the number of available resources in the buffer then, resources corresponding to the one or more requests are allocated in the buffer otherwise not. The method further includes adjusting (e.g., decrementing) the number of available resources and issuing the one or more requests. The number of resources may then be adjusted (e.g., incremented) upon the contents of the buffer being read out by other operations.

In another embodiment, the present invention is implemented as a system for graphics processing wherein a texture operation is broken into a texture request operation and a texture read back operation and further wherein results of a texture operation are stored in a buffer associated with the texture pipeline, not the register file. The system includes a scheduling module for selecting a thread for execution and a request tracking module for determining a number of texture requests of a thread. Each of the texture requests may correspond to a resource of an execution pipeline (e.g., slot of a texture pipeline or buffer slot of a texture unit). The system further includes a resource monitoring module for determining a number of available buffer resources of the execution pipeline and an execution module for determining whether to execute the requests based on the number of available resources (e.g., slots in a texture unit) to prevent deadlock and for allocating the resources of the execution pipeline.

In this manner, embodiments of the present invention generally facilitate increased utilization and therefore performance of graphics processing units (GPUs). Embodiments provide storage (e.g., a buffer) for a texture pipeline to store results thereby freeing up storage in the register file. The increased space available in the register file advantageously allows an execution unit to handle more threads concurrently. Embodiments of the present invention further prevent deadlock by controlling the number of multiple texture requests that may be issued based on the available buffer resources such that a point in a thread where the results are read can always be reached. Embodiments of the present invention thus provide for increased performance without deadlock.

In another embodiment, the present invention is implemented as a method for preventing computational deadlock in a system that stores texture results in a pipeline buffer, not the register file, and which breaks a texture instruction in two operations including a texture request and a texture read back operation. The method includes accessing an execution unit profile (e.g., for a texture unit). The execution unit profile may include a number of units processed per clock cycle and a number of pipeline resources. The number of pipeline resources may include a pipeline depth and a buffer size. The method further includes determining a number of requests per thread and threads which can be executed without deadlock and operating on only that many threads concurrently.

BRIEF DESCRIPTION OF THE DRAWINGS

The present invention is illustrated by way of example, and not by way of limitation, in the figures of the accompanying drawings and in which like reference numerals refer to similar elements.

DETAILED DESCRIPTION OF THE INVENTION

Figure 1:
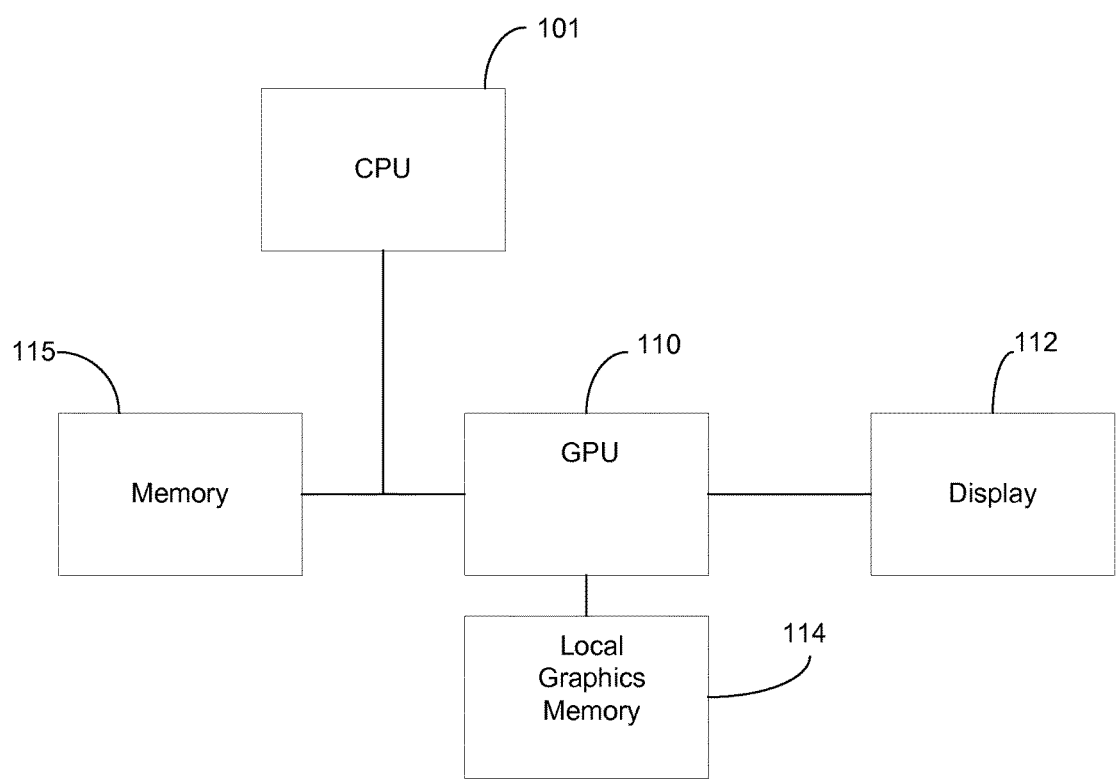
FIG. 1 shows an exemplary computer system in accordance with one embodiment of the present invention.

Reference will now be made in detail to the preferred embodiments of the present invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of embodiments of the present invention, numerous specific details are set forth in order to provide a thorough understanding of the present invention. However, it will be recognized by one of ordinary skill in the art that the present invention may be practiced without these specific details. In other instances, well-known methods, procedures, components, and circuits have not been described in detail as not to unnecessarily obscure aspects of the embodiments of the present invention.

Notation and Nomenclature:

Some portions of the detailed descriptions, which follow, are presented in terms of procedures, steps, logic blocks, processing, and other symbolic representations of operations on data bits within a computer memory. These descriptions and representations are the means used by those skilled in the data processing arts to most effectively convey the substance of their work to others skilled in the art. A procedure, computer executed step, logic block, process, etc., is here, and generally, conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "processing" or "accessing" or "executing" or "storing" or "rendering" or the like, refer to the action and processes of an integrated circuit (e.g., computing system 100 of FIG. 1), or similar electronic computing device, that manipulates and transforms data represented as physical (electronic) quantities within the computer system's registers and memories into other data similarly represented as physical quantities within the computer system memories or registers or other such information storage, transmission or display devices.

Computer System Platform:

FIG. 1 shows a computer system 100 in accordance with one embodiment of the present invention. Computer system 100 depicts the components of a basic computer system in accordance with embodiments of the present invention providing the execution platform for certain hardware-based and software-based functionality. In general, computer system 100 comprises at least one CPU 101, a system memory 115, and at least one graphics processor unit (GPU) 110. The CPU 101 can be coupled to the system memory 115 via a bridge component/memory controller (not shown) or can be directly coupled to the system memory 115 via a memory controller (not shown) internal to the CPU 101. The GPU 110 is coupled to a display 112. One or more additional GPUs can optionally be coupled to system 100 to further increase its computational power. The GPU(s) 110 is coupled to the CPU 101 and the system memory 115. The GPU 110 can be implemented as a discrete component, a discrete graphics card designed to couple to the computer system 100 via a connector (e.g., AGP slot, PCI-Express slot, etc.), a discrete integrated circuit die (e.g., mounted directly on a motherboard), or as an integrated GPU included within the integrated circuit die of a computer system chipset component (not shown). Additionally, a local graphics memory 114 can be included for the GPU 110 for high bandwidth graphics data storage.

The CPU 101 and the GPU 110 can also be integrated into a single integrated circuit die and the CPU and GPU may share various resources, such as instruction logic, buffers, functional units and so on, or separate resources may be provided for graphics and general-purpose operations. The GPU may further be integrated into a core logic component. Accordingly, any or all the circuits and/or functionality described herein as being associated with the GPU 110 can also be implemented in, and performed by, a suitably equipped CPU 101. Additionally, while embodiments herein may make reference to a GPU, it should be noted that the described circuits and/or functionality can also be implemented and other types of processors (e.g., general purpose or other special-purpose coprocessors) or within a CPU.

System 100 can be implemented as, for example, a desktop computer system or server computer system having a powerful general-purpose CPU 101 coupled to a dedicated graphics rendering GPU 110. In such an embodiment, components can be included that add peripheral buses, specialized audio/video components, IO devices, and the like. Similarly, system 100 can be implemented as a handheld device (e.g., cellphone, etc.), direct broadcast satellite (DBS)/terrestrial set-top box or a set-top video game console device such as, for example, the Xbox®, available from Microsoft Corporation of Redmond, Wash., or the PlayStation3®, available from Sony Computer Entertainment Corporation of Tokyo, Japan. System 100 can also be implemented as a "system on a chip", where the electronics (e.g., the components 101, 115, 110, 114, and the like) of a computing device are wholly contained within a single integrated circuit die. Examples include a hand-held instrument with a display, a car navigation system, a portable entertainment system, and the like.

Embodiments of the present invention generally facilitate increased graphics processing utilization of the GPU and therefore facilitate increased performance of the graphics processing units (GPUs). Embodiments provide a texture pipeline buffer to store texture results thereby freeing up storage in the register file which conventionally is used. The increased space available in the register file allows an execution unit to handle more threads concurrently. Embodiments of the present invention further prevent pipeline deadlock by controlling the number of multiple texture requests that may be issued to the pipeline such that a point in each thread where the results are read back will always be reached and executable. Embodiments of the present invention thus provide for increased processor performance without deadlock.

Figure 2:
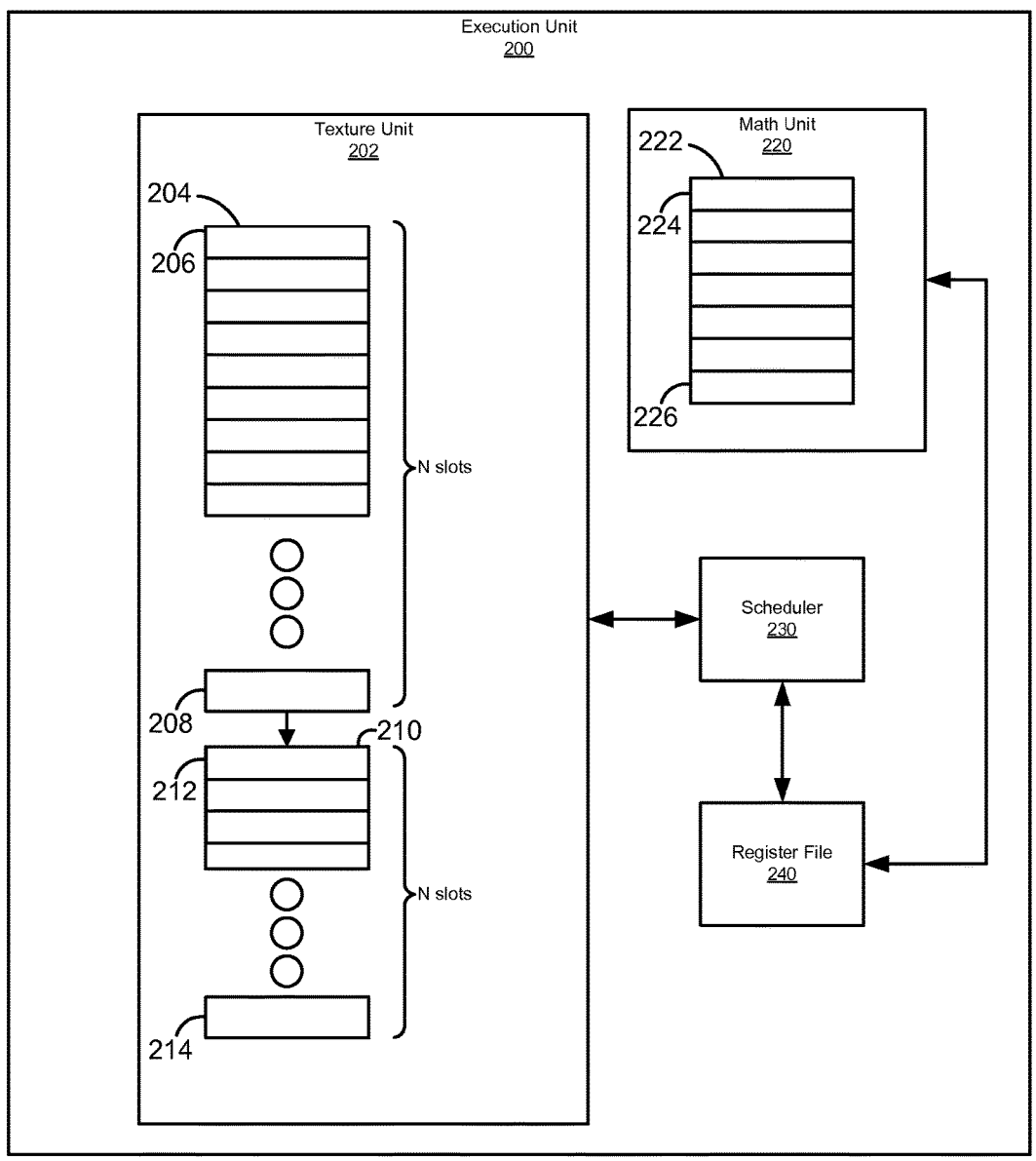
FIG. 2 shows a block diagram of an exemplary execution unit in accordance with one embodiment of the present invention.

FIG. 2 shows a block diagram of an exemplary execution unit of a GPU in accordance with one embodiment of the present invention. Execution unit 200 includes texture unit 202, math unit 220, scheduler 230, and register file 240. It is appreciated that a GPU (e.g., GPU 110) may have multiple execution units substantially similar to execution 200 for execution of multiple threads in parallel. For example, a GPU may have 8 processor groups each with 2 execution units. Embodiments may thus support single instruction multiple data (SIMD) execution (e.g., one instruction for 16 pixels in parallel). In one embodiment, a thread, as described herein, is an individual pixel of an image or video frame as is well known in the art.

Texture unit 202 includes texture pipeline 204 and pipeline buffer 210. Texture pipeline 204 has N slots or pipeline locations 206-208. Texture pipeline 204 writes results to pipeline buffer 210. Texture operations often require going to memory which can take a relatively long time (e.g., 300 clock cycles). Texture pipeline 204 may thus be 300 slots or elements long to accommodate this delay. For example, texture pipeline 204 may have each slot operable to receive four pixels per clock cycle for computing a level of detail (LOD) computation by analyzing the neighboring pixels and determining how far off each of the pixels are in the texture. In order to keep texture pipeline 204 busy with a sufficient workload, 1200 pixels or threads of work are needed for a texture unit with 300 slots of depth with 4 pixels per slot. Other threads may be worked on while texture operations are performed by texture pipeline 204. For threads that issue multiple texture operations back to back less threads are required to keep the pipeline full. For example, for threads issuing two texture operations back to back, only half as many threads are required to keep the pipeline full.

Math unit 220 includes math pipeline 222 which has slots 224-226. Math requests may be issued to math unit 220 while a thread waits for a texture request to complete. In one embodiment, math unit 220 obtains source data from register file 240 and returns results destination data to register file 240. For example, if math unit 220 can handle 16 pixels per clock and takes 5 clocks to return results, 80 threads will keep the math unit busy as long as the instructions are independent and each thread has one instruction outstanding at a time. As another example, where each thread is able to issue a math instruction each cycle will need 16 threads to keep the pipeline busy. Referring to the above example, 1280 threads will keep both texture unit 202 and math unit 220 busy. If 1280 threads are not available, execution units will be left without work resulting in a bubble or period of no processing activity. It is appreciated that bubbles in the execution unit are undesirable except when the pipeline is being loaded.

It is desirable to process more threads through the pipeline to increase performance. Therefore, using threads with multiple texture operations allows multiple increased texture threads to be processed simultaneously. Embodiments of the present invention provide pipeline buffer 210 as an advantageous means to provide texture storage without needing a correspondingly large register file, which is typically required in the convention art to accommodate the increased number of threads being simultaneously processed.

Register File 240 stores thread information. Each unit of work has state information associated with the unit of work for handling thread. For example, for a pixel state information may include X, Y, and texture coordinates. The size of register file 240 can be based on the width (e.g., pixels per clock) and depth (e.g., clock cycles) of the texture and math units. That is, the number of registers controls the number of pixels or threads that can reside in execution unit 200 in an incomplete state. In one embodiment, the use of texture pipeline 204 and pipeline buffer 210 as storage for texture data reduces the necessary resources of register file 240 to process the same number of threads, or alternatively, a same sized register file can process an increased number of threads simultaneously thereby increasing performance over a conventional unit.

In one embodiment, scheduler 230 writes coordinates of texture operations into texture pipeline 202. No storage locations in register file 240 are required that correspond to the coordinates written into texture pipeline 202. In one embodiment, texture unit 202 may have a buffer (not shown) for texture operation requests to be stored before entering texture pipeline 204. A buffer for texture operations to be stored before entering texture pipeline 204 may thus allow texture coordinates to be generated in the buffer before texture pipeline 204 thereby freeing up registers that might otherwise be used for buffering texture coordinates.

Pipeline buffer 210 is operable to store results output from texture pipeline 204. A thread reads the texture operation result out of the texture pipeline before the pipeline stalls from each slot being occupied with an unread result. Pipeline buffer 210 includes N slots or storage locations 212-214. Pipeline buffer 210 allows a certain amount of time before a result needs to be read out of pipeline buffer 210 to avoid stalling the pipeline. It is appreciated that pipeline buffer 210 allows texture requests to be issued to texture pipeline 204 without having space allocated for the result in register file 240 at the time the request is issued to texture pipeline 204 and while the texture request is processed by texture pipeline 204. Storage for reading a result from pipeline buffer 210 may thus be dynamically allocated for upon the result being available in pipeline buffer 210. Because texture operations do not use the register file, in accordance with embodiments of the present invention each texture operation is broken into two operations, a request to the texture unit (texture request) and an operation reading the result back from the texture unit.

In one embodiment, when a texture request is issued into a slot of texture pipeline 202 a slot in pipeline buffer 210 is assigned for storing the result of the texture request. Pipeline buffer 210 may be a variety of storage types including, but not limited to, a first in, first out (FIFO) buffer. It is appreciated that results can be read from pipeline buffer 210 in an out of order manner. For example, for a buffer with 16 slots, each 16th request issued will be assigned the same slot. Further for a buffer with 16 slots, each result from the texture pipe is to be read within 16 clock cycles to avoid stalling the pipeline due to all the buffer slots being unavailable (e.g., having unread results). The buffer slot may be based on the cycle the instruction entered the texture pipeline.

Some texturing operations may require substantially more storage than other texturing operations. For example, a texturing operation may require sampling a texture at 16 samples and averaging the results. With conventional texture pipelines, 16 samples would be required for each of the locations which can then be averaged. The increased storage in a register file of conventional texture pipelines thereby limits the number of threads that can be processed at a given time. Embodiments of the present invention can issue 16 requests to the texture pipeline and then read the results out one at a time and add the results to the results thus far thereby reducing or obviating the need for space for the 16 samples in register file 240. It is further appreciated that a compiler may be involved in determining when data needs to be stored in the register file or can be computed as the results are received in texture pipeline buffer 210.

The use of pipeline buffer 210 allows the use of a smaller register file because requests can be issued before storage locations are need for the results. For example, 16 requests can be issued and the space corresponding to coordinates in the register file can now be reallocated to additional threads. Referring to the above example where the texture results are averaged, their results do not require allocation of space as the results can be combined in a single register. Pipeline buffer 210 thus facilitates processing of more threads at a given time thereby keeping execution units busy. More specifically, pipeline buffer 210 allows texture pipeline 204 to effectively be used as storage because the portion of register file 240 that stored the coordinates or other data that was written to texture pipeline 204 is now available for storage of data for other threads. It is appreciated that pipeline buffer 210 further prevents bubbles by allowing the processing of more threads at a given time.

The use of pipeline buffer 210 allows emulation of source and destination instructions. In one embodiment, a state machine of scheduler 230 writes texture requests into texture unit 204 and reads the results out of pipeline buffer 210 instead of using register file 240 as storage for results. For example, an instruction for the texture operation of coordinates stored in registers R0-R3 (e.g., "text R0-R3"), may be executed where the data of registers R0-R3 is written into texture pipeline 204 and the results are read out of pipeline buffer 210 and stored in registers R0-R3. It is appreciated that a source and destination instruction may become two instructions: 1) writing the texture instruction into the texture pipeline and 2) reading the result out of the texture unit to the buffer.

Figure 3:
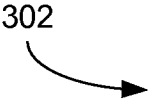
FIG. 3 shows a diagram of an exemplary thread in accordance with one embodiment of the present invention.

FIG. 3 shows a diagram of an exemplary thread in accordance with one embodiment of the present invention allowing multiple texture operations. Exemplary thread 300 includes request A 304, request B 306, request C 308, request D 310, MADD 312, read result A 314, read result B 316, read result C 318, and read result D 320. It is appreciated that MADD instructions (e.g., MADD 312) may not be dependent on a texture result and therefore do not need to wait for a texture result. In one embodiment, thread 300 is executed by a GPU execution unit (e.g., execution unit 200). It is appreciated that thread 300 may include more requests, madds, and read results. Requests 304-310, MADD 312, and read results 314-320 may have been arranged by a compiler.

Program counter 302 starts execution of thread 300 at request A 304. In one embodiment, the number of requests is determined, in this instance, there are four texture requests 304-310. The number of available resources (e.g., texture unit slots including pipeline slots and buffer storage locations) is checked as to whether there are four texture unit resources available. If there are four texture resources available, a resource allocation counter may be incremented by four corresponding to requests 304-310 being issued to pipeline 204. The allocation of the four texture resources to thread 300 ensures that when the texture operations are complete, results 314-320 will be guaranteed to be readable (e.g., from pipeline buffer 210) to prevent deadlock. In one embodiment, the checking of the resources and allocation of the resources are atomic operations.

If there are not four texture resources available, thread 300 may be put to sleep until there are four texture resources available. Another thread may be executed if the there are sufficient resources for the execution of that thread. Texture resources become available as texture operations move down the texture pipeline and texture processing results are read from the pipeline buffer. According to embodiments, a thread is only allowed to put all texture requests onto the pipeline or put nothing. This prevents deadlock because a thread cannot ever issue any of its texture fetches until it gets to the point where the thread can read texture processing results out of the pipeline buffer. When the results buffer gets full, then the pipeline stops until something is read. If the threads that are expected to read the texture results are waiting to issue further texture requests, then deadlock results. In addition, if these threads take a path through the shader program that does not read the texture results deadlock results.

In one embodiment, as program counter 302 moves onto requests 306-308, a resource allocation counter may not be changed with regard to the issuing of request 306-308. Upon the issuing of each of read requests 314-320, the resource allocation counter may be decremented by one corresponding to a slot of a pipeline buffer (e.g., pipeline buffer 210) becoming free as each of read requests 314-320 are performed.

It is appreciated that resource tracking may be performed in a variety of ways. For example, the resource allocation counter could be initialized to a number of free or available resources in a texture unit and each time a set of requests is issued the counter is reduced by the number of requests. As each result is read out of the texture unit, the counter is incremented (e.g., the counter is incremented as each of results 314-320 is read). This represents a dynamic allocation structure.

It is appreciated that a static allocation can also be used to prevent deadlock. In this embodiment, it is know how many spots the system can hold. For instance, if 400 resources are available in the texture pipeline, and each thread requires four texture operations, then the scheduler 230 allows only 100 concurrent threads at any time to prevent deadlock. In this instance no counter is required.

It is further appreciated that the instructions of a thread can be arranged or ordered by a compiler to optimize execution. For example, texture requests may be moved ahead of math requests (e.g., MADD 312) where the texture requests are not dependent upon the math requests, such that the math requests may be completed while the texture requests are being processed. This rearrangement of instructions allows the threads to occupy less space as instructions are executed concurrently and the texture request information is stored in the texture unit (e.g. texture unit 202). The compiler may further arrange instructions to maintain an expected workload ratio (e.g., four math requests for each texture request). It is appreciated that the workload ratio may be a factor around which the hardware units were designed and balancing the work around that ratio ensures that bubbles in the workload are minimized.

Figure 4:
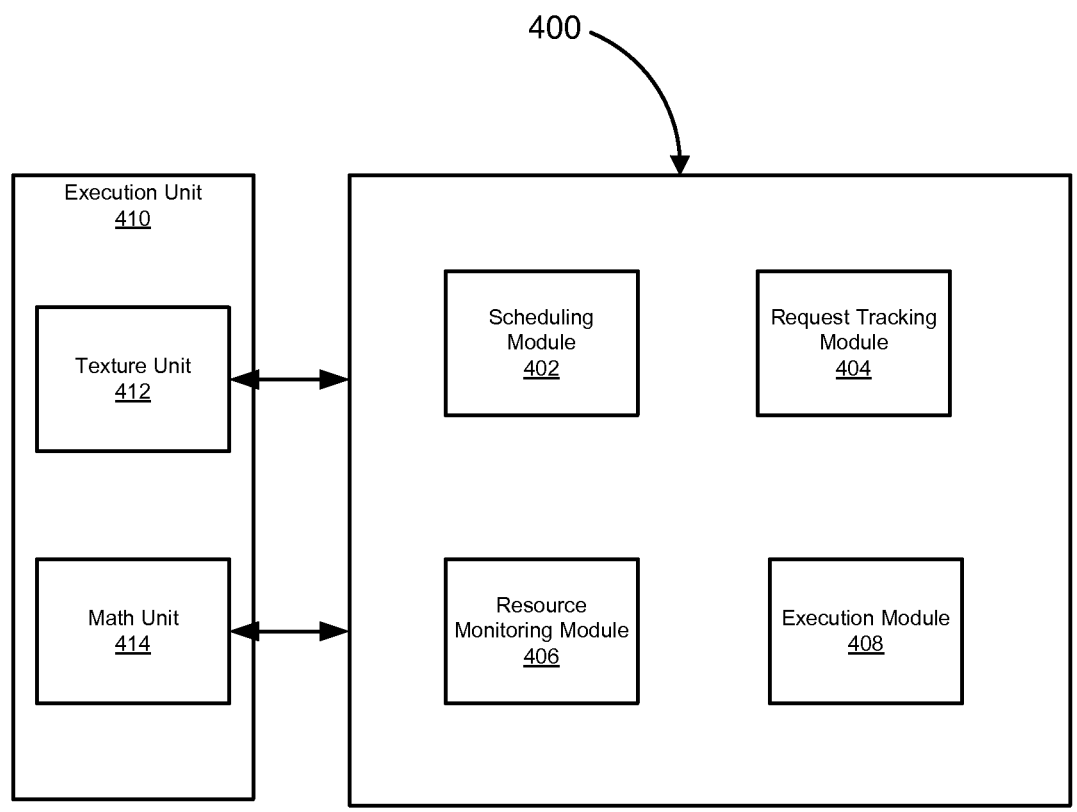
FIG. 4 shows a block diagram of an exemplary system in accordance with one embodiment of the present invention.

FIG. 4 illustrates example components used by various embodiments of the present invention. Although specific components are disclosed in system 400, it should be appreciated that such components are examples. That is, embodiments of the present invention are well suited to having various other components or variations of the components recited in system 400. It is appreciated that the components in system 400 may operate with other components than those presented, and that not all of the components of system 400 may be required to achieve the goals of system 400.

FIG. 4 shows a block diagram of an exemplary system in accordance with one embodiment of the present invention. System 400 may be implemented in hardware or software. In one embodiment, system 400 facilitates processing graphics instructions for rendering of an image or video on a display. System 400 communicates and/or controls execution unit 410 which may be part of a GPU. System 400 includes scheduling module 402, request tracking module 404, resource monitoring module 406, and execution module 408.

Scheduling module 402 selects a thread for execution. Scheduling module 402 may select a thread for execution and schedule execution of a portion of the thread (e.g., one or more texture requests and one or more math requests). Scheduling module 402 may the select a next thread for execution or a portion thereof.

Request tracking module 404 determines a number of texture requests. In one embodiment, the requests may be issued to an execution pipeline of texture unit 412 or math unit 414. More specifically, the number of requests may be a number of texture requests to a texture pipeline before a read of the texture results. In one embodiment, the texture pipeline of texture unit 412 includes a buffer for storing results from the texture pipeline of texture unit 412. As described herein, the requests may have been arranged by a compiler.

Resource monitoring module 406 determines a number of available resources of the execution pipeline (e.g., texture pipeline and pipeline buffer). In one embodiment, resource monitoring module 406 determines a number of available resources of the execution pipeline of texture unit 412. In another embodiment, resource monitoring module 406 determines a number of available resources based on a counter corresponding to a number of resources available (e.g., unallocated), e.g., dynamic architecture. In yet another embodiment, resource monitoring module 406 determines a number of available resources by checking a number corresponding to a maximum number of threads that can be in progress at a given time, e.g., static architecture.

Execution module 408 determines whether to execute the requests based on the number of available resources and allocates the resources of the execution pipeline. If adequate resources are not available to store the data of the request, then the request, or group of requests, is not issued. In one embodiment, execution module 408 determines whether to execute the requests and allocates the resources of the pipeline as an atomic operation thereby avoiding parallel thread execution problems where the same resources are assigned to two or more threads.

The determination of execution module 408 as to whether to execute requests and allocate resources prevents deadlock. Execution module 408 ensures that portions of thread (with requests) can always proceed to the portions where the results are read out. In other words, the pipeline contents only become empty when they are read out. If the thread never can get to a point where it can read out its content because the pipeline is full, then deadlock occurs. Embodiments of the present invention allow either full allocation of resources before a set of requests is issued or no requests are issued. This prevents deadlock because all the texture requests are not issued until it is checked that the program will be able to proceed to the portion where the results are read out of the texture unit. Generally speaking, for a thread with X texture requests, X slots in the texture unit are reserved or allocated before the X texture requests are issued.

For example, where the texture pipeline has 300 slots and the buffer has 16 slots or storage locations, 316 texture requests may be made without the pipeline halting. Slots are reserved in a group for each request up until the results are read off. For example, if a thread includes four texture requests, the four texture requests will be issued (only if there are four slots available) along with the four slots of the texture unit allocated corresponding to those requests. Thus, each thread will be able to issue requests only if there are enough resources to ensure the threads will get to point where the results will be read out of texture unit 412.

It is appreciated that once the texture unit resources are allocated for that thread, the texture requests may be issued at the convenience of scheduling module 402 because the allocation of resources to that thread ensures the requests can be executed. Due to the time texture requests take for completion, threads may be put to sleep by scheduling module 402 until the results are ready for reading from the texture unit or until other non-texture operations can be completed. For instance threads that are waiting for texture results may also have math requests issued to the math units (e.g., math unit 414).

Figure 5:
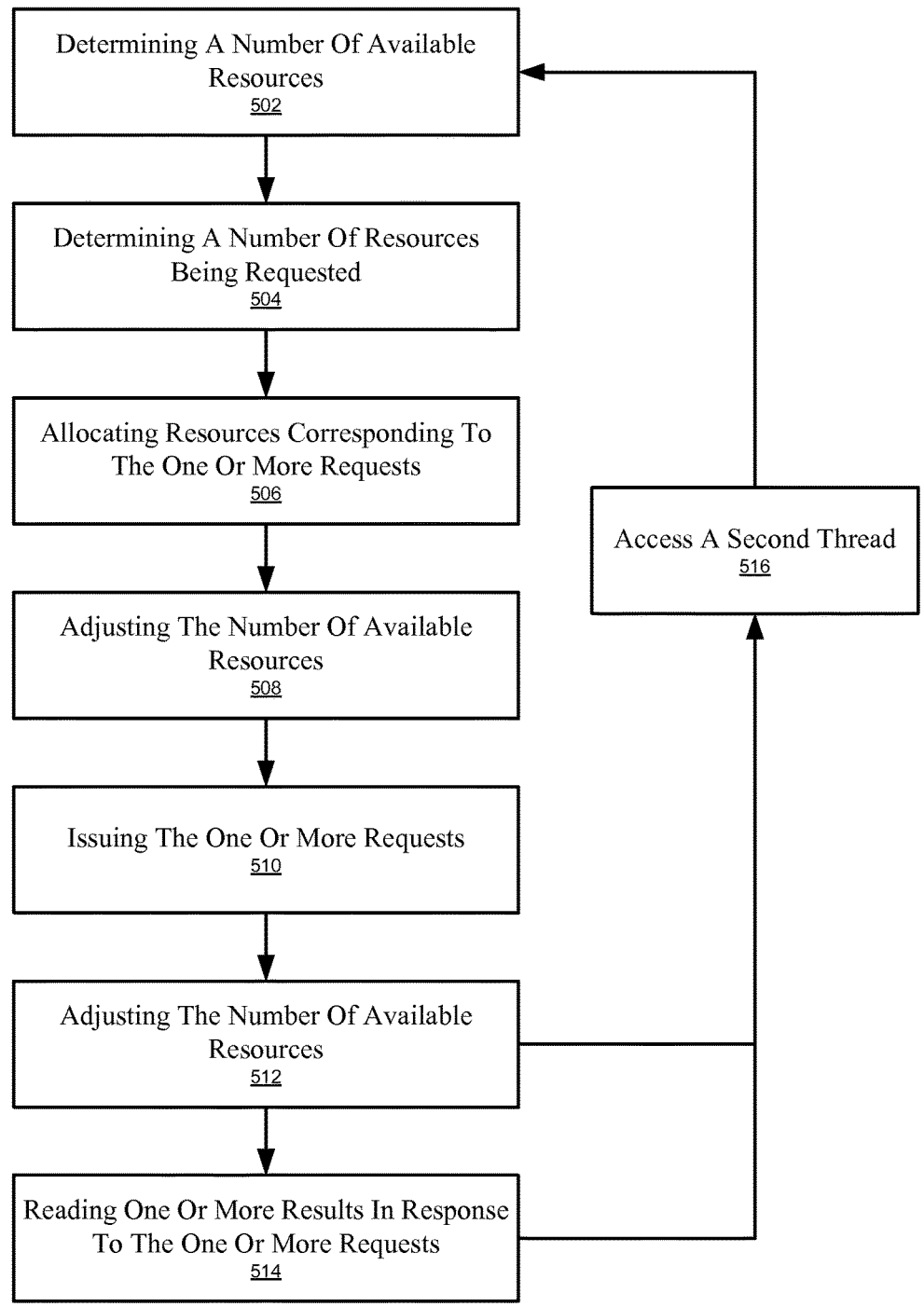
FIG. 5 shows a flowchart of an exemplary computer controlled process for preventing deadlock of a graphics processing unit (GPU).
Figure 6:
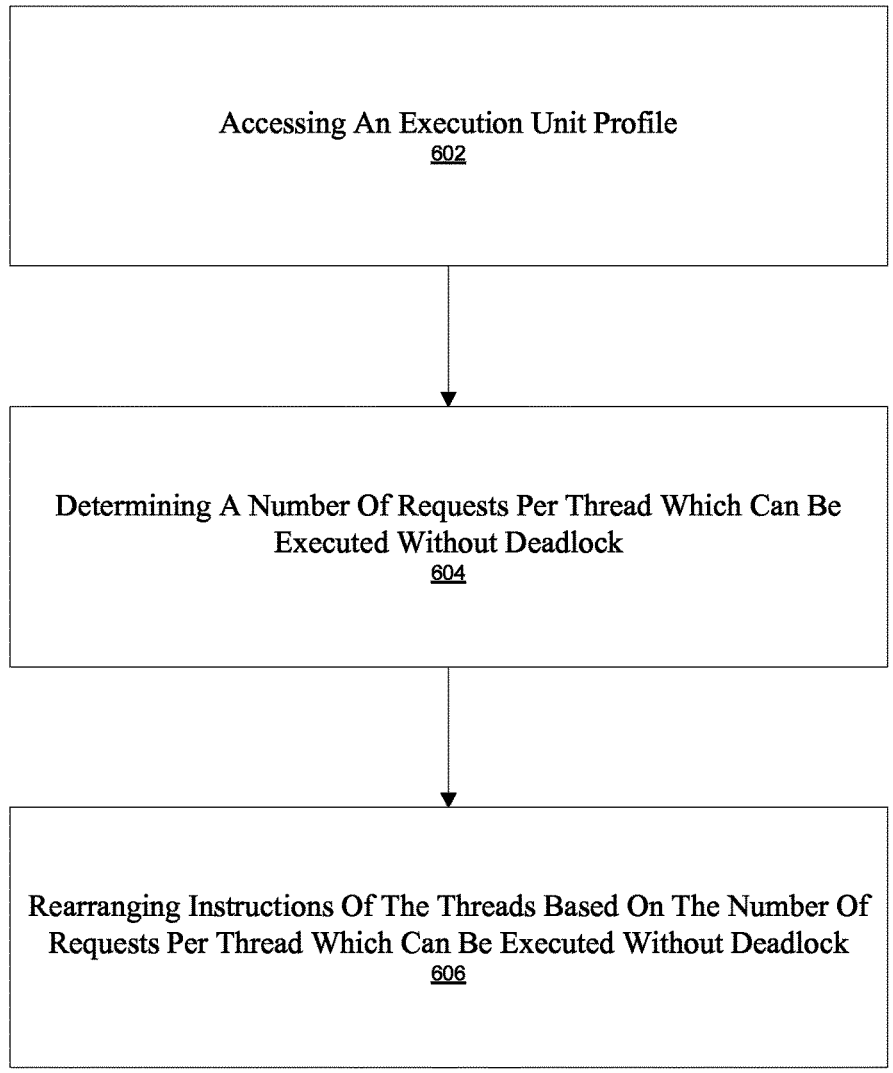
FIG. 6 shows a flowchart of an exemplary computer controlled process for preventing deadlock in accordance with one embodiment of the present invention.

With reference to FIGS. 5-6, flowcharts 500 and 600 illustrate example functions used by various embodiments of the present invention. Although specific function blocks ("blocks") are disclosed in flowcharts 500 and 600, such steps are examples. That is, embodiments are well suited to performing various other blocks or variations of the blocks recited in flowcharts 500 and 600. It is appreciated that the blocks in flowcharts 500 and 600 may be performed in an order different than presented, and that not all of the blocks in flowcharts 500 and 600 may be performed.

FIG. 5 shows a flowchart of an exemplary computer controlled process for preventing deadlock of a functional pipeline of graphics processing unit (GPU) that uses a pipeline buffer to store execution results of various threads. The method of flowchart 500 may further facilitate efficient use of processing resources of a GPU by not requiring register file storage to process texture operations of threads. It is appreciated that the process of flowchart 500 may be a dynamic process for preventing deadlock.

In block 502, a number of available resources of the pipeline buffer and/or pipeline is determined. As described herein, the available resources may comprise a portion of a pipeline buffer of a functional pipeline (e.g., a texture pipeline) or a buffer portion of a texture pipeline. As described herein, the number resources available may be determined based on a counter tracking the number of available resources.

In block 504, a number of resources being requested is determined based on one or more texture requests of a first thread. For texture requests made in groups, the number being requested is all the requests in the group.

In block 506, in response to the requested number of resources being less than the number of available resources, resources corresponding to the one or more requests are allocated to the pipeline. As described herein, the determining of the number of available resources and the allocating of resources corresponding to the number of requested resources may be atomic operations.

In block 508, the number of available resources is adjusted to accommodate the issued requests. As described herein, the adjusting may include incrementing the number tracking the available resources. It is appreciated that the number of resources may be incremented or decremented based on the manner in which the number tracking the resources is compared to the resources of an execution unit.

In block 510, the one or more requests are issued. As described herein, the requests may be texture requests. In this fashion, the set of texture requests are issued such that when the corresponding reads of the same thread are executed, the data is guaranteed to be in the buffer.

In block 512, the number of available resources is adjusted. As described herein, the adjusting may include decrementing the number of available resources. If there are additional threads with requests, block 516 may be performed and a second thread is accessed. After block 516 is performed, block 502 may be performed for the second tread. If one or more of the request results are available, block 514 may be performed.

In block 514, one or more results in response to the one or more requests are read. As described herein, the results are read from the pipeline buffer of the texture unit. Block 516 may then be performed and a second thread is selected.

FIG. 6 shows a flowchart of an exemplary computer controlled process for preventing deadlock in accordance with one embodiment of the present invention in a system which writes results data of a functional pipeline to a pipeline buffer, and not the register file. In one embodiment, the method of flowchart 600 may be performed by a compiler. It is appreciated that the process of flowchart 600 may be a static process for preventing deadlock.

In block 602, an execution unit profile is accessed for a GPU. The execution unit may include a texture unit and a math unit. In one embodiment, the execution unit profile includes a number of units (e.g., pixels) processed per clock cycle and a number of pipeline resources. The number of pipeline resources may include a pipeline depth and a buffer size. In one embodiment, the buffer size corresponds to the size of a texture pipeline result buffer.

In block 604, a number of texture requests per thread and threads which can be executed without deadlock is determined. As described herein, the number of requests per thread and threads may be based on the number of texture requests needing issuance before the results of the texture requests will be read. For example, if a texture pipeline and pipeline buffer has 400 slots and there are four texture requests per thread before a read is required, the number of concurrent threads may be limited to 100 in this system to prevent deadlock. In one embodiment, the number of threads is based on a tile of an image such that all threads of a spatial tile will complete before the next tile is processed. For example, the threads of a tile may be scheduled together to take advantage of multiple tiles resident in a processor. It is appreciated that this may take advantage of any cache locality. A tile may thus be processed to enable completion of a texture request and texture return sequence without possibility of texture pipe stall due to lack of resources.

In block 606, instructions of the threads based on the number of requests per thread which can be executed without deadlock are rearranged. As described herein, a compiler may rearrange instructions to ensure that a limited number of requests may be issued before the results are read by a thread.

The foregoing descriptions of specific embodiments of the present invention have been presented for purposes of illustration and description. They are not intended to be exhaustive or to limit the invention to the precise forms disclosed, and many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the claims appended hereto and their equivalents.

What is claimed is:

1. A processor group of a graphics processing unit, said processor group comprising:
   a register file for storing data related to a plurality of threads concurrently operable within said processor group;
   a texture unit for processing texture operations of said plurality of threads wherein each texture operation comprises a texture request operation and a corresponding texture read-back operation;
   a buffer separate from said register file and within said texture unit for receiving results of said texture operations from said texture unit and storing said results, wherein said corresponding texture read-back operation reads from said buffer; and
   a circuit for preventing deadlock within said texture unit and comprising a circuit for determining a number of texture request operations for said texture unit of a thread,
   wherein said number of texture request operations comprises a number of multiple texture request operations that are present within said thread before a texture read-back operation is present within said thread.

2. A processor group as described in claim 1 further comprising a math functional unit for processing math operations of said plurality of threads, wherein said math functional unit is coupled to receive source operands from said register file and also coupled to store results into said register file.

3. A processor group as described in claim 1 further comprising a counter for maintaining a count of vacant memory resources of said buffer and said texture unit.

4. A processor group as described in claim 3 wherein said circuit for preventing deadlock further comprises:
a circuit for issuing said number of texture request operations to said texture unit provided there is sufficient vacant memory resources of said buffer and said texture unit to accommodate all of said number of texture request operations, otherwise not issuing any of said number of texture request operations to said texture unit.

5. A processor group as described in claim 1 wherein said circuit for preventing deadlock within said texture unit is further for preventing deadlock by allowing only a predetermined number of threads, or less, to concurrently operate with said texture unit wherein said predetermined number of threads is based on a number of texture request operations within each thread and based further on a size of said buffer and said texture unit.

6. A processor group as described in claim 5 wherein said predetermined number of threads is computed by dividing said size of said buffer and said size of said texture unit by said number of texture request operations within each thread.

7. A processor group of a graphics processing unit, said processor group comprising:
a register file for storing data related to a plurality of threads concurrently operable within said processor group;
a texture unit for processing texture operations of said plurality of threads wherein each texture operation comprises a texture request operation and a corresponding texture read-back operation; and
a buffer separate from said register file and within said texture unit for receiving results of said texture operations from said texture unit and storing said results, wherein said corresponding texture read-back operation reads from said buffer; and
a circuit for preventing deadlock within said texture unit, said circuit for preventing deadlock comprising:
a circuit for determining a number of texture request operations for said texture unit of a thread; and
a circuit for issuing said number of texture request operations to said texture unit provided there is sufficient vacant memory resources of said buffer and said texture unit to accommodate all of said number of texture request operations, otherwise not issuing any of said number of texture request operations to said texture unit,
wherein said number of texture request operations comprises a number of multiple texture request operations that are present within said thread before a texture read-back operation is present within said thread.

8. A processor group as described in claim 7 further comprising:
a math functional unit for processing math operations of said plurality of threads, wherein said math functional unit is coupled to receive source operands from said register file and also coupled to store results into said register file.

9. A processor group as described in claim 7 further comprising:

a counter operable for maintaining a count of vacant memory resources of said buffer and said texture unit.

10. A processor group as described in claim 9 wherein said maintaining of said count of vacant memory resources of said buffer comprises decreasing said count of said vacant memory resources of said buffer responsive to said issuing said number of texture operation requests to said texture unit.

11. A processor group as described in claim 9 wherein said maintaining of said count of vacant memory resources of said buffer comprises increasing said count of said vacant memory resources of said buffer responsive to said thread executing said read-back operations.

12. A processor group as described in claim 7 wherein said circuit for issuing said number of texture request operations to said texture unit is operable to issue only those grouped texture request operations that have allocated result space within said buffer wherein grouped texture request operations are all unissued sequential texture request operations within a thread that precede a first unissued texture read-back operation of said thread.

13. A processor group as described in claim 7 wherein said register file does not receive results from execution of said texture unit.

14. A circuit comprising:
a processor;
a register file;
a texture unit; and
a buffer separate from said register file and within said texture unit,
wherein said processor is configured to: store data in said register file, wherein said data is related to a plurality of threads concurrently operable within said processor; process texture operations of said plurality of threads using said texture unit, wherein each texture operation comprises a texture request operation and a corresponding texture read-back operation; store results of said texture operations in said buffer, wherein said corresponding texture read-back operation reads from said buffer; and prevent deadlock within said texture unit by allowing only a predetermined number of threads, or less, to concurrently operate with said texture unit wherein said predetermined number of threads is based on a number of texture request operations within each thread and based further on a size of said buffer and said texture unit, and
wherein said predetermined number of threads is computed by dividing said size of said buffer and said size of said texture unit by said number of texture request operations within each thread.

15. A circuit as described in claim 14, wherein said processor is configured to
process math operations of said plurality of threads, receive source operands from said register file, and store results into said register file.

16. A circuit as described in claim 14 wherein said processor is configured to maintain a count of vacant memory resources of said buffer and said texture unit.

17. A circuit as described in claim 16 wherein said processor is configured to maintain said count of vacant memory resources of said buffer by decreasing said count of said vacant memory resources of said buffer responsive to said issuing said number of texture operation requests to said texture unit.

18. A circuit as described in claim 17 wherein said processor is configured to maintain said count of vacant memory resources of said buffer further by increasing said count of said vacant memory resources of said buffer responsive to said thread executing said read-back operations.

\* \* \* \* \*